United States Patent
Choi et al.

(10) Patent No.: US 7,391,864 B2
(45) Date of Patent: Jun. 24, 2008

(54) APPARATUS AND METHOD FOR HIERARCHICAL ENCRYPTION

(75) Inventors: Yang-lim Choi, Gyeonggi-do (KR); Yun-ho Choi, Seoul (KR); Yun-sang Kim, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 816 days.

(21) Appl. No.: 10/623,800

(22) Filed: Jul. 22, 2003

(65) Prior Publication Data

US 2004/0143732 A1 Jul. 22, 2004

(30) Foreign Application Priority Data

Aug. 29, 2002 (KR) .................. 10-2002-0051488

(51) Int. Cl.
H04L 9/12 (2006.01)
(52) U.S. Cl. ....................................... 380/28
(58) Field of Classification Search ............ 380/45, 380/47
See application file for complete search history.

(56) References Cited

U.S. PATENT DOCUMENTS

| 6,456,985 | B1 * | 9/2002 | Ohtsuka ................... 705/51 |
| 6,473,859 | B1 * | 10/2002 | Enokida ................... 713/164 |
| 7,155,011 | B2 * | 12/2006 | Ueda et al. ................ 380/37 |
| 2003/0002668 | A1 * | 1/2003 | Graunke et al. ............ 380/45 |

FOREIGN PATENT DOCUMENTS

| CN | 1159112 A | 9/1997 |
| EP | 0768774 A2 * | 4/1997 |
| JP | 06-259012 | 9/1994 |
| JP | 8-181966 | 7/1996 |
| JP | 8-8852 | 12/1996 |
| JP | 09-046679 | 2/1997 |
| JP | 11-098487 | 4/1999 |
| JP | 11-98487 | 4/1999 |
| JP | 11-308184 | 11/1999 |
| JP | 11-331618 | 11/1999 |
| JP | 11331618 | 11/1999 |
| JP | 2003-324418 | 11/2003 |

OTHER PUBLICATIONS

Menezes, Vanstone O.: "Handbook of Applied Cryptography," 1997, CRC Press, pp. 334, 498-499, and 551-552.
Japanese Office Action issued Jan. 17, 2006 in Japanese Patent Application No. 2003-304952 corresponding to the present above- identified pending U.S. Patent Application, 7 pages.
Japanese Office Action in corresponding Patent Application No. 2003-304952.
Chinese Office Action dated Oct. 14, 2005 in corresponding Chinese patent application No. 03148414.X.

* cited by examiner

*Primary Examiner*—Matthew B Smithers
(74) *Attorney, Agent, or Firm*—Staas & Halsey LLP

(57) ABSTRACT

An apparatus and method to encrypt data having hierarchical information are provided. The apparatus includes an N-th layer key generator, which generates an N-th layer key, an (N+1)-th layer key generator, which generates an (N+1)-th layer key by applying the N-th layer key to a predetermined function, an N-th layer data encryptor, which encrypts N-th layer data using the N-th layer key, and an (N+1)-th layer data encryptor, which encrypts (N+1)-th layer data using the (N+1)-th layer key.

65 Claims, 6 Drawing Sheets

FIG. 1 (PRIOR ART)

DATA ENCRYPTED USING SINGLE KEY

| ENCRYPTED USING K | —11 |

DATA ENCRYPTED USING PLURALITY OF KEYS

| ... | ENCRYPTED USING K1 | ENCRYPTED USING K2 | ... | —12

■ : ENCRYPTED USING K1
▨ : ENCRYPTED USING K2
☐ : ENCRYPTED USING K3

| OBJECT TO BE DECRYPTED | KEY TO BE TRANSMITTED |
|---|---|
| KEY FRAME | K1 |
| KEY CLIP | K1, K2 |
| ENTIRE VIDEO DATA | K1, K2, K3 |

■ : ENCRYPTED USING K3
▨ : ENCRYPTED USING K2
☐ : ENCRYPTED USING K1

K3=FUNC2(K2)
K2=FUNC1(K1)
FUNC1, FUNC2: ONE-WAY FUNCTION

| OBJECT TO BE DECRYPTED | KEY TO BE TRANSMITTED |
|---|---|
| KEY FRAME | K3 |
| KEY CLIP | K2 |
| ENTIRE VIDEO DATA | K1 |

APPARATUS AND METHOD FOR HIERARCHICAL ENCRYPTION

CROSS-REFERENCE TO RELATED APPLICATIONS

This application claims the priority of Korean Patent Application No. 2002-51488, filed on Aug. 29, 2002, which is incorporated herein in its entirety by reference.

BACKGROUND OF THE INVENTION

1. Field of the Invention

The present invention relates to an apparatus and method to encrypt data having hierarchical information.

2. Description of the Related Art

With wide spread of digital media data, protection of copyright becomes more important. If the copyright is not appropriately protected, content providers cannot provide adequate service, and consequently, digital media service business cannot be developed. Furthermore, protection of the copyright must be applied to even a small part of the data as well as the entire data. For example, it is necessary to protect a single frame (a still image) of video data. MACROVISION is usually used for the protection of analog data. A method of encrypting the data using codes is usually used for the protection of the digital data. Various encryption algorithms can be used for encryption of the digital data. The encryption algorithm may be a simple one based on a private key and an XOR operation or a complex one based on a single private key (symmetric) or a private or public key pair (asymmetric). At present, symmetric encryption algorithms are generally used for digital media data in terms of complexity, convenience, and security. In symmetric algorithms, a single key or a plurality of keys periodically changing is used to encrypt the entire media data.

Media services have been developed in various ways. For example, a video on demand (VOD) service allows a user to watch or download only a part (several key frames or a 30-second key clip) of a video instead of the entire video. In addition, international standards (for example, a moving picture experts group 7 (MPEG-7)) have been established in order to enable users to watch or download only a part of the video. The international standards include a video content description containing hierarchical structure information of the video. The most important purpose of such standardization is to allow the various media services to be based on standard meta-data specifications.

Hereinafter, problems in conventional technology will be described with reference to the attached drawings.

FIG. 1 is a diagram showing structures of the encrypted data used in conventional methods of encrypting the media data. The conventional methods of encrypting the media data include a single key encryption 11 and a multi-key encryption 12. In the single key encryption 11, the entire media data or a subset of the media data is encrypted using a single key K. In the multi-key encryption 12, the entire media data or a subset of the media data is encrypted using a plurality of keys K1 and K2. In the multi-key encryption 12, usually, the keys K1 and K2 are periodically or nonperiodically changed. It is usual to put a flag in the media data in order to report a change of a key. Generally, the keys K1 and K2 are not highly related to the media data to be encrypted.

Generally, the media data is encrypted using a symmetric code. Because an asymmetric code requires a much more complex key generation algorithm and a bigger key size than the symmetric code, the asymmetric code is inappropriate for the encryption of the media data requiring fast and a large amount of processing. When a symmetric code is used, the same private key is used for both encryption and decryption.

FIG. 2 is a block diagram of a conventional apparatus to encrypt the media data. The conventional apparatus to encrypt the media data includes a key generator 21, a key buffer 22, a data encryptor 23, a key encryptor 24, a storage block, and a transmitter 26.

The key generator 21 generates the keys used to encrypt the media data. The key buffer 22 temporarily stores and provides the keys to the data encryptor 23 or the key encryptor 24 when the keys are needed. The data encryptor 23 encrypts the data using the provided keys. The key encryptor 24 encrypts the keys. The storage block 25 stores the encrypted media data and the encrypted keys. The transmitter 26 transmits the encrypted media data and the encrypted keys stored in the storage block 25.

FIG. 3 is a block diagram of a conventional apparatus for decrypting the media data. The conventional apparatus for decrypting the media data includes a receiver 31, a key decryptor 32, a key buffer, and a data decryptor 34.

The receiver 31 receives the encrypted data and the keys from the transmitter 26 shown in FIG. 2. The key decryptor 32 decrypts the encrypted keys. The key buffers 33 temporarily stores and provides the decrypted keys to the data decryptor 34 when the decrypted keys are needed. The data decryptor 34 decrypts the encrypted data using the keys.

As shown in FIGS. 2 and 3, when a symmetric code encryption is used, a server and a client need to share the key for the encryption and the decryption. In media service servers, the media data is encrypted using the single key or the plurality of keys. The key after being encrypted, another key is used for the media encryption. The encrypted media data and the encrypted key are transmitted to the client. The client receives the encrypted media data and the key. Thereafter, the encrypted key is decrypted, and then the encrypted media data is decrypted using the decrypted key.

If a satisfactory environment for digital data service is established, the user can initially order only several key frames of different media data and reproduce the key frames and then order only the media data corresponding to a key frame to the user's taste. For such a scenario, it is necessary to protect the data (i.e., the key frames and key clips). However, the conventional apparatuses shown in FIGS. 2 and 3 do not effectively support a situation in which a part of the data is transmitted and received. In other words, when only the single key is used to encrypt the entire data, the data can be easily hacked. In the meantime, when pa] the plurality of keys are used, a bandwidth or memory space for the key transmission is unnecessarily required.

For example, 1-hour video data can be expressed as a tree structure in which the key frame is defined as a leaf, the entire video data is defined as a root, a key clip is defined as an intermediate node, and a parent is defined as including a child. In the tree structure, the key clip and the key frame are elements representing semantically important parts of the entire video data. The tree structure is stated in the international standard specification such as the MPEG-7. More flexible media services can be provided based on the tree structure. For example, the user may want to watch or download only the key clip including essential key frames instead of the entire video data, or the user may order only several frames of the video data or request a preview composed of several key clips of different video data before deciding to watch or download the entire video data. In this scenario, all of the video data pieces (i.e., the key frames and the key clips) are necessary to be transmitted under protection. However, conventional encryption methods do not satisfactorily support the protection because the encryption methods do not consider the hierarchical information of the video data.

FIG. 4 is a structural diagram of a conventional method of encrypting the video data. With development of various types of the media services (for example, VOD) based on the content of the media data and the user's taste, a media data encryption method that can support the various types of media services is required. Conventional encryption methods have the following two problems.

First, the conventional encryption methods are vulnerable to hacking when the single key is used for the encryption. In other words, when the single key is used for the encryption, the same encryption key is used for the key frame, the key clip, and the entire video data. Accordingly, once the encryption key for the key frame or the key clip is received by the user, the entire video data can be decrypted using the received encryption key. Consequently, the media data can be easily hacked.

Second, even if the plurality of keys are used for the encryption, the conventional encryption methods have a problem in that a wide bandwidth is required for key transmission when the encryption is performed without considering hierarchical information of the media data in media services. In other words, when the plurality of keys are used for the encryption, different encryption keys are used for the video data in different layers of a hierarchical structure in order to overcome the problem occurring in the method using the single key, so the wide bandwidth is required. For example, when the video data is structured in three layers, i.e., the key frame, the key clip, and the entire video data, assuming that the data portion of the key frame is referred to as A data, the data portion of the key clip, except the key frame, is referred to as B data, and the data portion of the entire video data except the key frame and the key clip is referred to as C data. Then, the A data can be encrypted using the key K1, the B data can be encrypted using the key K2, and the C data can be encrypted using a key K3. Accordingly, in order to decrypt the key frame, the key K1 is needed. In order to decrypt the key clip, the keys K1 and K2 are needed. In order to decrypt the entire video data, the keys K1, K2, and K3 are needed. In this case, when considering the hierarchical structure of the video data, unnecessary key transmission is performed.

SUMMARY OF THE INVENTION

The present invention provides an apparatus and method to efficiently encrypt a part of entire data as well as the entire data having hierarchical information.

The present invention also provides an apparatus and method to encrypt data, which provide strong protection against hacking and require just a narrow transmission bandwidth.

According to an aspect of the present invention, there is provided an apparatus to hierarchically encrypt media data. The apparatus includes an N-th layer key generator, which generates an N-th layer key; an (N+1)-th layer key generator, which generates an (N+1)-th layer key by applying the N-th layer key to a predetermined function; an N-th layer data encryptor, which encrypts N-th layer data using the N-th layer key; and an (N+1)-th layer data encryptor, which encrypts (N+1)-th layer data using the (N+1)-th layer key.

According to another aspect of the present invention, there is provided an apparatus for hierarchically decrypting media data. The apparatus includes an N-th layer key generator, which generates an N-th layer key; an (N+1)-th layer key generator, which generates an (N+1)-th layer key by applying the N-th layer key to a predetermined function; an encrypted N-th layer data decryptor, which decrypts encrypted N-th layer data using the N-th layer key; and an encrypted (N+1)-th layer data decryptor, which decrypts encrypted (N+1)-th layer data using the (N+1)-th layer key.

According to still another aspect of the present invention, there is provided an apparatus for hierarchically encrypting and decrypting media data. The apparatus includes a hierarchical encryption unit, which generates an N-th layer key, generates an (N+1)-th layer key by applying the generated N-th layer key to a predetermined function, encrypts N-th layer data using the N-th layer key, and encrypts (N+1)-th layer data using the generated (N+1)-th layer key; and a hierarchical decryption unit, which generates the N-th layer key, generates the (N+1)-th layer key by applying the N-th layer key to the predetermined function, decrypts the encrypted N-th layer data using the N-th layer key, and decrypts the encrypted (N+1)-th layer data using the (N+1)-th layer key.

According to still another aspect of the present invention, there is provided a method and computer readable storage medium controlling a computer and comprising a process of hierarchically encrypting media data. The method and the process include generating an N-th layer key; generating an (N+1)-th layer key by applying the N-th layer key to a predetermined function; encrypting N-th layer data using the N-th layer key; and encrypting (N+1)-th layer data using the (N+1)-th layer key.

According to still another aspect of the present invention, there is provided a method and a computer readable storage medium controlling a computer and comprising a process of hierarchically decrypting media data. The method and the process include generating an N-th layer key; generating an (N+1)-th layer key by applying the N-th layer key to a predetermined function; decrypting encrypted N-th layer data using the N-th layer key; and decrypting encrypted (N+1)-th layer data using the (N+1)-th layer key.

According to still another aspect of the present invention, there is provided a method and a computer readable storage medium controlling a computer and comprising a process of hierarchically encrypting and decrypting media data. The method and the process include generating an N-th layer key, generating an (N+1)-th layer key by applying the generated N-th layer key to a predetermined function, encrypting N-th layer data using the N-th layer key, and encrypting (N+1)-th layer data using the generated (N+1)-th layer key; and generating the N-th layer key, generating the (N+1)-th layer key by applying the N-th layer key to the predetermined function, decrypting the encrypted N-th layer data using the N-th layer key, and decrypting the encrypted (N+1)-th layer data using the (N+1)-th layer key.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the aspects of the present invention, taken in conjunction with the accompanying drawings of which:

FIG. 1 is a diagram showing structures of encrypted data used in conventional methods to encrypt media data;

DETAILED DESCRIPTION OF THE INVENTION

Figure 2:
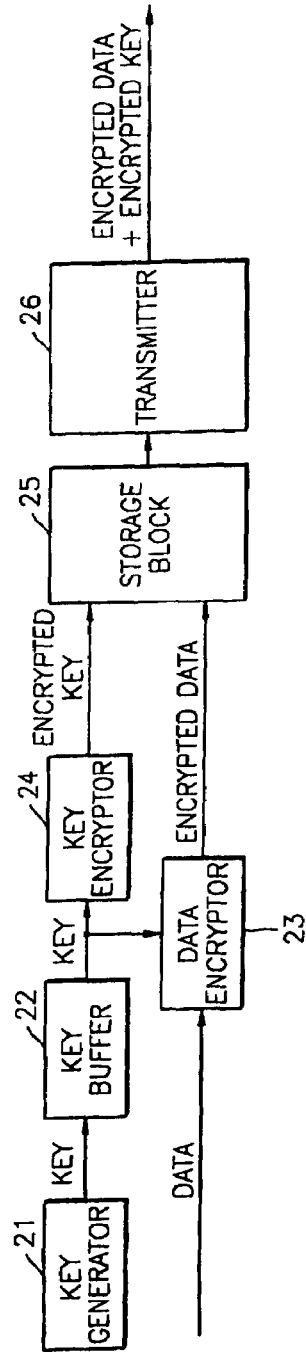
FIG. 2 is a block diagram of a conventional apparatus to encrypt media data.
Figure 3:
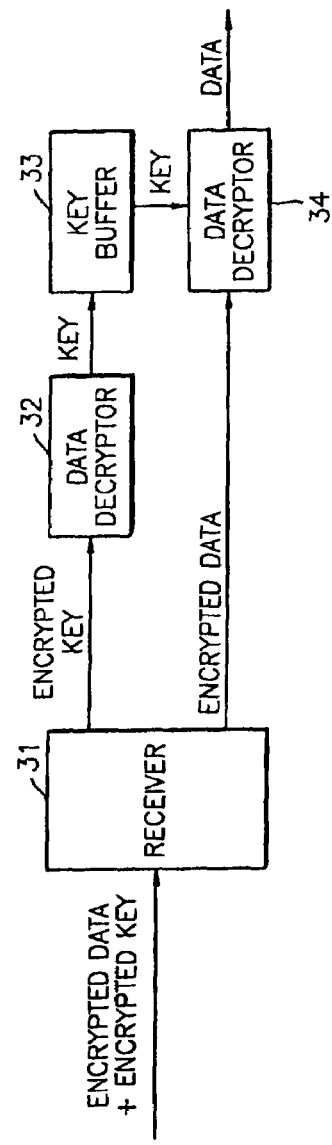
FIG. 3 is a block diagram of a conventional apparatus to decrypt media data.
Figure 4:
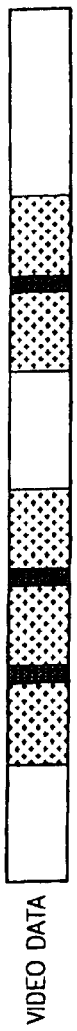
FIG. 4 is a structural diagram of a conventional method to encrypt video data.

Reference will now be made in detail to the aspects of the present invention, examples of which are illustrated in the accompanying drawings, wherein like reference numerals refer to like elements throughout. The aspects are described below in order to explain the present invention by referring to the figures.

Figure 5:
FIG. 5 is a structural diagram of a method of hierarchically encrypting the video data, according to an aspect of the present invention.

FIG. 5 is a structural diagram of a method of hierarchically encrypting video data, according to an aspect of the present invention. Media data indicates any type of reproducible data, such as video data, graphic data, or audio data. The media data containing hierarchical information is usually the video data or the audio data. According to an aspect of the present invention, only the video data will be described, but the present invention is not restricted thereto.

In order to satisfactorily support the hierarchical information; the method of hierarchically encrypting the video data, according to an aspect of the present invention, has the following features. Semantic fragments of the video data, i.e., a fragment including key frames, a fragment including key clips except the key frames, and a fragment including entire video data except the key clips and the key frames, are encrypted using different keys. The keys must preserve the layer of each semantic fragment of the video data. For example, a client must be able to decrypt (decode) a key clip at a higher layer using a key at a lowest layer that is used to encrypt the video data.

According to an aspect of the present invention, there is also provided a block diagram for supporting demands of servers and clients and an encryption method. Generally, meta-data associated with the media data is not just hierarchical information but also includes other semantic and grammatical information. However, in the present invention, only the hierarchical information is dealt with.

Figure 6:
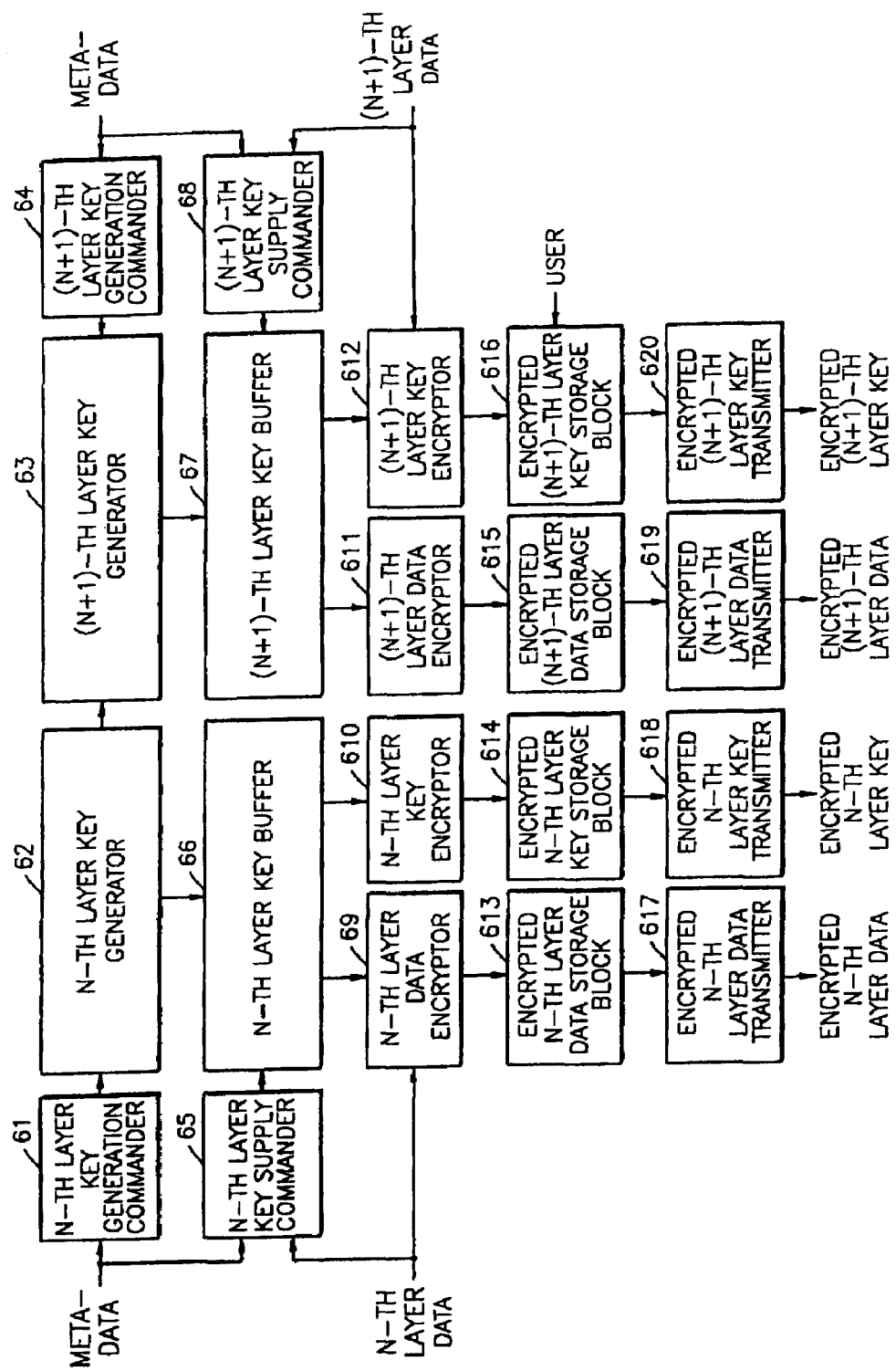
FIG. 6 is a block diagram of an apparatus to hierarchically encrypt the video data, according to an aspect of the present invention.

FIG. 6 is a block diagram of an apparatus to hierarchically encrypt the video data according to an aspect of the present invention. The apparatus to hierarchically encrypt the video data includes an N-th layer key generator 62, an (N+1)-th layer key generator 63, an N-th layer data encryptor 69, and an (N+1)-th layer data encryptor 611. N-th layer data and (N+1)-th layer data are included in different layers of the media data.

The N-th layer key generator 62 generates an N-th layer key. The (N+1)-th layer key generator 63 generates an (N+1)-th layer key by applying the N-th layer key to a one-way function. The N-th layer data encryptor 69 encrypts the N-th layer data using the N-th layer key. The (N+1)-th layer data encryptor 611 encrypts the (N+1)-th layer data using the (N+1)-th layer key.

The one-way function is a process by which a value of the function can be found from an input value but the input value cannot be found from the value of the function. A one-way function includes a secure hash algorithm (SHA), a message digest (MD) 5 algorithm, a discrete exponentiation (for example, an exponentiation module big prime number), and a simple padding algorithm.

When N is set to a value of a lowest layer, that is, when N increases starting from 1 and N=1, the N-th layer data is the entire video data except key clip data and key frame data, and the (N+1)-th layer data is the key clip data except the key frame data. In other words, first layer data is the entire video data except the key clip data and the key frame data, and second layer data is the key clip data except the key frame data. The first layer key generator 62 generates a first layer key in a form of a random number using a random number generator (not shown) because it is advantageous in terms of security to set a key for the lowest layer to a value which cannot be predicted by hackers. Under such a data setup environment, when N=2, the N-th layer data is the key clip data except the key frame data, and the (N+1)-th layer data is the key frame data. In other words, the second layer data is the key clip data except the key frame data, and third layer data is the key frame data. Here, the N-th layer key generator 62 generates the N-th layer key by applying the (N−1)-th layer key to the one-way function. In other words, the second layer key generator 62 generates the second layer key by applying a first layer key to the one-way function.

Accordingly, the N-th layer key generator 62 and the (N+1)-th layer key generator 63 generate the keys in the form of the random number or according to a user's arbitrary selection when N is the value of the lowest layer. However, for the higher layers afterward, the N-th layer key generator 62 and the (N+1)-th layer key generator 63 generate the keys using the one-way function.

In order to synchronize the generation of the N-th layer key with the encryption of the N-th layer data using the N-th layer key, the apparatus shown in FIG. 6 additionally includes an N-th layer key buffer 66, an N-th layer key generation commander 61, and an N-th layer key supply commander 65.

The N-th layer key buffer 66 temporarily stores the N-th layer key. When the N-th layer key generation commander 61 receives the meta-data, the N-th layer key generation commander 61 commands the N-th layer key generator 62 to generate the N-th layer key according to the meta-data. When the N-th layer key supply commander 65 receives the N-th layer data, the N-th layer key supply commander 65 commands the N-th layer key buffer 66 to supply the N-th layer key to the N-th layer data encryptor 69 according to the meta-data. The meta-data describes data. When the data is the media data, the meta-data contains the hierarchy information (for example, whether the data is the entire video data, a key clip, or a key frame).

In order to synchronize the generation of the (N+1)-th layer key with encryption of the (N+1)-th layer data using the (N+1)-th layer key, the apparatus shown in FIG. 6 additionally includes an (N+1)-th layer key buffer 67, an (N+1)-th layer key generation commander 64, and an (N+1)-th layer key supply commander 68.

The (N+1)-th layer key buffer 67 temporarily stores the (N+1)-th layer key. When the (N+1)-th layer key generation commander 64 receives the meta-data, the (N+1)-th layer key generation commander 64 commands the (N+1)-th layer key generator 63 to generate the (N+1)-th layer key according to the meta-data. When the (N+1)-th layer key supply commander 68 receives the (N+1)-th layer data, the (N+1)—the layer key supply commander 68 commands the (N+1)-th layer key buffer 67 to supply the (N+1)-th layer key to the (N+1)-th layer data encryptor 611 according to the meta-data. The meta-data describes the data. When the data is the media data, the meta-data contains the hierarchy information (for example, whether the data is the entire video data, the key clip, or the key frame).

When the meta-data contains tree-type hierarchical information, the media data is divided into data fragments, i.e., semantic fragments, having no intersection therebetween. Each data fragment corresponds to a node in the tree. In order to detect a depth (layer) and a position of the node corresponding to the media data to be encrypted, the hierarchy information related to the media data is read from the meta-data. How many keys are necessary to be consecutively generated is detected from the hierarchy information and a result indicative thereof is then reported using a signal to the key generator 62 or 63. In addition, a signal is transmitted to the key buffer 66 or 67 in order to provide the correct key to be applied to the media data that has just been encrypted.

An apparatus for hierarchically encrypting the data needs to encrypt the key as the well as data before transmission in order to increase security. The hacker knowing an encryption algorithm can easily decrypt the encrypted data only if the hacker finds out the key. Accordingly, as shown in FIG. 6, the apparatus to hierarchically encrypt the data, according to an aspect of the present invention, additionally includes an N-th layer key encryptor 610. The N-th layer key encryptor 610 encrypts the N-th layer key.

The apparatus to hierarchically encrypt the data, according to an aspect of the present invention, additionally includes an encrypted N-th layer key transmitter 618 to transmit the encrypted N-th layer key.

Instead of immediately transmitting the encrypted N-th layer key, the encrypted key can be transmitted only at a request from the user. It is usual to transmit the encrypted data and the key to a receiver when the user recognizes that the receiver is in a state in which the receiver can receive the encrypted data. Accordingly, the apparatus to hierarchically encrypt the, data, according to an aspect of the present invention, additionally includes an encrypted N-th layer key storage block 614 and the encrypted N-th layer key transmitter 618 in order to transmit the encrypted N-th layer key only upon request from the user. The encrypted N-th layer key storage block 614 stores the encrypted N-th layer key. The encrypted N-th layer key transmitter 618 transmits the encrypted N-th layer key at the request from the user.

The apparatus to hierarchically encrypt the data needs to encrypt the key as well as the data before transmission in order to increase the security. The hacker knows the encryption algorithm can easily decrypt the encrypted data only if the hacker finds out the key. Accordingly, as shown in FIG. 6, the apparatus to hierarchically encrypt the data, according to an aspect of the present invention, additionally includes an (N+1)-th layer key encryptor 612. The (N+1)-th layer key encryptor 612 encrypts the (N+1)-th layer key.

The apparatus to hierarchically encrypt the data, according to an aspect of the present invention, additionally includes an encrypted (N+1)-th layer key transmitter 620 to transmit the encrypted (N+1)-th layer key.

Instead of immediately transmitting the encrypted (N+1)-th layer key, the encrypted key can be transmitted only at the request from the user. It is usual to transmit the encrypted data and the key to the receiver when the user recognizes that the receiver is in a state in which the receiver can receive the encrypted data. Accordingly, the apparatus to hierarchically encrypt the data, according to an aspect of the present invention, additionally includes an encrypted (N+1)-th layer key storage block 616 and the encrypted (N+1)-th layer key transmitter 620 in order to transmit the encrypted (N+1)-th layer key at the request from the user. The encrypted (N+1)-th layer key storage block 616 stores the encrypted (N+1)-th layer key. The encrypted (N+1)-th layer key transmitter 620 transmits the encrypted (N+1)-th layer key at the request from the user.

The apparatus to hierarchically encrypt the data, according to an aspect of the present invention, additionally includes an encrypted N-th layer data transmitter 617 to transmit the encrypted N-th layer data.

Instead of immediately transmitting the N-th layer encrypted data, the encrypted data can be transmitted only at the request from the user. It is usual to transmit the encrypted data and the key to the receiver when the user recognizes that the receiver is in a state in which the receiver can receive the encrypted data. Accordingly, the apparatus to hierarchically encrypt the data, according to an aspect of the present invention, additionally includes an encrypted N-th layer data storage block 613 and the encrypted N-th layer data transmitter 617 to transmit the encrypted N-th layer data only at the request from the user. The encrypted N-th layer data storage block 613 stores the encrypted N-th layer data. The encrypted N-th layer data transmitter 617 transmits the encrypted N-th layer data at the request from the user.

The apparatus to hierarchically encrypt the data, according to an aspect of the present invention, additionally includes an encrypted (N+1)-th layer data transmitter 619 to transmit the encrypted (N+1)-th layer data.

Instead of immediately transmitting the encrypted the (N+1)-th layer data, the encrypted data can be transmitted only at the request from the user. It is usual to transmit the encrypted data and key to the receiver when the user recognizes that the receiver is in a state in which the receiver can receive encrypted data. Accordingly, the apparatus to hierarchically encrypt the data, according to an aspect of the present invention, additionally includes an encrypted (N+1)-th layer data storage block 615 and the encrypted (N+1)-th layer data transmitter 619 to transmit the encrypted (N+1)-th layer data only at the user's request. The encrypted (N+1)-th layer data storage block 615 stores the encrypted (N+1)-th layer data. The encrypted (N+1)-th layer data transmitter 619 transmits the encrypted (N+1)-th layer data at the request from the user.

Figure 7:
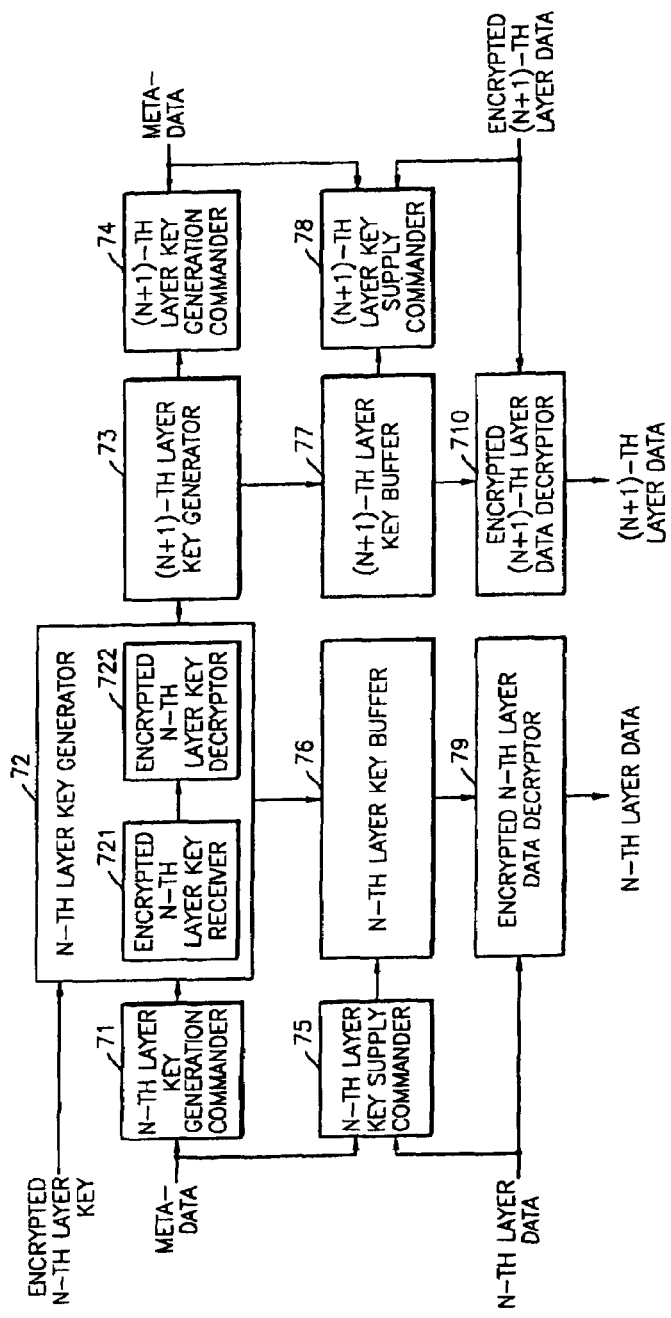
FIG. 7 is a block diagram of an apparatus to hierarchically decrypt video data, according to an aspect of the present invention.

FIG. 7 is a block diagram of an apparatus to hierarchically decrypt the video data, according to an aspect of the present invention. The apparatus hierarchically decrypting the video data includes an N-th layer key generator 72, an (N+1)-th layer key generator 73, an encrypted N-th layer data decryptor 79, and an encrypted (N+1)-th layer data decryptor 710.

The N-th layer key generator 72 generates the N-th layer key. The (N+1)-th layer key generator 73 generates the (N+1)-th layer key by applying the N-th layer key to the one-way function. The encrypted N-th layer data decryptor 79 decrypts the encrypted N-th layer data using the N-th layer key. The encrypted (N+1)-th layer data decryptor 710 decrypts encrypted (N+1)-th layer data using the (N+1)-th layer key.

The one-way function is a process that can deduce the value of the function from the input value but cannot deduce the input value from the value of the function. It is essential, for security reasons how a common one-way function is applied to both a transmitter and the receiver. Generally, the common one-way function can be directly installed in the transmitter and the receiver during manufacturing or downloaded to the transmitter and the receiver using a protective method.

When N is set to the value of the lowest layer, that is, when N increases starting from 1 and N=1, the N-th layer data is the entire video data except the key clip data and the key frame data, and the (N+1)-th layer data is the key clip data except the key frame data. In other words, the first layer data is the entire video data except the key clip data and the key frame data, and second layer data is the key clip data except the key frame data. The N-th layer key generator 72 receives the encrypted N-th layer key and generates the N-th layer. More specifically, the N-th layer key generator 72 includes the encrypted N-th layer key receiver 721 receiving the encrypted N-th layer key and an encrypted N-th layer key decryptor 722 decrypting the received encrypted N-th layer key to generate the N-th layer key. Generally, a received signal contains both the encrypted data and the encrypted key. The encrypted key is separated from the received signal and then decrypted.

Under such a data setup environment, when N=2, the N-th layer data is the key clip data except the key frame data, and the (N+1)-th layer data is the key frame data. In other words, the second layer data is the key clip data except the key frame data, and the third layer data is the key frame data. Here, the N-th layer key generator 72 generates the N-th layer key by applying the (N−1)-th layer key to the one-way function. In other words, the second layer key generator 72 generates the second layer key by applying the first layer key to the one-way function.

Accordingly, the N-th layer key generator 72 and the (N+1)-th layer key generator 73 generate the keys by decrypting the received encrypted keys when N is the value of the lowest layer. However, for the higher layers afterward, the N-th layer key generator 72 and the (N+1)-th layer key generator 73 generate the keys using the one-way function.

In order to synchronize the generation of the N-th layer key with the decryption of the encrypted N-th layer data using the N-th layer key, the apparatus shown in FIG. 7 additionally includes an N-th layer key buffer 76, an N-th layer key generation commander 71, and an N-th layer key supply commander 75.

The N-th layer key buffer 76 temporarily stores the N-th layer key. When the N-th layer key generation commander 71 receives the meta-data, the N-th layer key generation commander 71 commands the N-th layer key generator 72 to generate the N-th layer key according to the meta-data. When the N-th layer key supply commander 75 receives the encrypted N-th layer data, the N-th layer key supply commander 75 commands the N-th layer key buffer 76 to supply the N-th layer key to the encrypted N-th layer data decryptor 79, according to the meta-data describing data. When the data is the media data, the meta-data contains the hierarchy information (for example, whether the data is the entire video data, the key clip, or the key frame).

In order to synchronize the generation of the (N+1)-th layer key with the decryption of the encrypted (N+1)-th layer data using the (N+1)-th layer key, the apparatus shown in FIG. 7 additionally includes an (N+1)-th layer key buffer 77, an (N+1)-th layer key generation commander 74, and an (N+1)-th layer key supply commander 78.

The (N+1)-th layer key buffer 77 temporarily stores the (N+1)-th layer key. When the (N+1)-th layer key generation commander 74 receives the meta-data, the (N+1)-th layer key generation commander 74 commands the (N+1)-th layer key generator 73 to generate the (N+1)-th layer key according to the meta-data. When the (N+1)-th layer key supply commander 78 receives the (N+1)-th layer data, the (N+1)-th layer key supply commander 78 commands the (N+1)-th layer key buffer 77 to supply the (N+1)-th layer key to the encrypted (N+1)-th layer data decryptor 710, according to the meta-data describing data. When the data is the media data, the meta-data contains the hierarchy information (for example, whether the data is the entire video data, the key clip, or the key frame).

Figure 8:
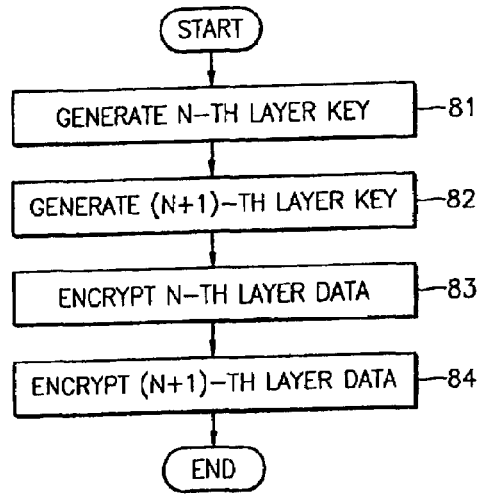
FIG. 8 is a flowchart of a method to hierarchically encrypt the video data, according to an aspect of the present invention.

FIG. 8 is a flowchart of a method to hierarchically encrypt the video data, according to an aspect of the present invention. At N-th layer key is generated at operation 81. Next, the (N+1)-th layer key is generated by applying the N-th layer key to the one-way function at operation 82. Next, the N-th layer data is encrypted using the N-th layer key at operation 83. Next, (N+1)-th layer data is encrypted using the (N+1)-th layer key at operation 84.

The one-way function is a process by which the value of the function can be found from the input value but the input value cannot be found from the value of the function.

When N is set to the value of the lowest layer, the N-th layer data is the entire video data except for the key clip data and the key frame data, and the (N+1)-th layer data is the key clip data except the key frame data. When N is set to a value higher than the value of the lowest layer by one, the N-th layer data is the key clip data except the key frame data, and the (N+1)-th layer data is the key frame data.

Figure 9:
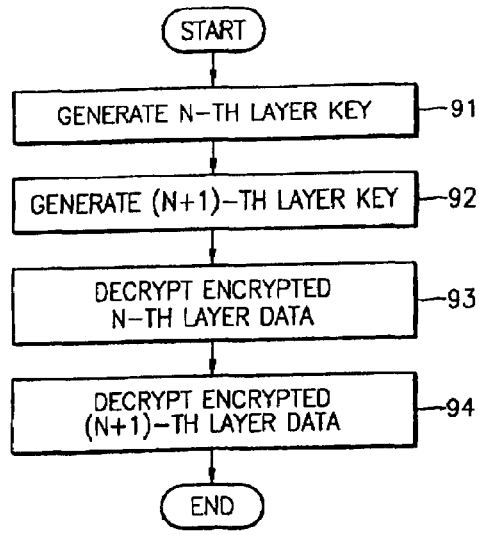
FIG. 9 is a flowchart of a method to hierarchically decrypt aspect of the present invention.

FIG. 9 is a flowchart of a method of the hierarchically decrypt video data, according to an aspect of the present invention. The N-th layer key is generated at operation 91. Next, the (N+1)-th layer key is generated by applying the N-th layer key to the one-way function at operation 92. Next, the encrypted N-th layer data is decrypted using the N-th layer key at operation 93. Next, the encrypted (N+1)-th layer data is decrypted using the (N+1)-th layer key at operation 94.

The one-way function is a process by which the value of the function can be found from the input value but the input value cannot be found from the value of the function.

When N is set to the value of the lowest layer, the N-th layer data is the entire video data except the key clip data and the key frame data, and the (N+1)-th layer data is the key clip data except the key frame data. When N is set to the value higher than the value of the lowest layer by one, the N-th layer data is the key clip data except the key frame data, and the (N+1)-th layer data is the key frame data.

The above-described aspects of the present invention can be realized as programs, which can be executed in a universal digital computer through a computer readable recording medium. The computer readable recording medium may be a storage media, such as a magnetic storage medium (for example, a ROM, a floppy disc, or a hard disc), or an optical readable medium (for example, a CD-ROM or DVD).

According to an aspect of the present invention, even if a hacker knows a key for a semantic fragment of a certain layer, the hacker cannot easily access semantic fragments of lower layers, so, according to an aspect of the present invention, there is provided reliable security in terms of hacking related to hierarchical layers. In addition, when a semantic fragment of a certain layer and an encryption key therefore are received, all of the semantic fragments at lower layers can be decrypted in a receiver, so a bandwidth for key transmission can be reduced. Moreover, compared to a conventional multi-key encryption system using a complex symmetric code, according to an aspect of the present invention, keys are encrypted for semantic fragments at lower layers than a layer of initially encrypted semantic fragment using one-way functions, so the present invention is less complex than the conventional multi-key encryption system.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in a descriptive sense only and not for purposes of limitation. Therefore, the scope of the invention is defined hot by the detailed description of the invention but by the appended claims, and all differences within the scope will be construed as being included in the present invention.

What is claimed is:

1. An apparatus to hierarchically encrypt media data, comprising:
    an N-th layer key generator generating an N-th layer key;
    an (N+1)-th layer key generator generating an (N+1)-th layer key by applying the N-th layer key to a predetermined function;
    an N-th layer data encryptor encrypting N-th layer media data using the N-th layer key; and
    an (N+1)-th layer data encryptor encrypting (N+1)-th layer media data using the (N+1)-th layer key.

2. The apparatus of claim 1, wherein the predetermined function is a one-way function to deduce a value of the function from an input value but not to deduce the input value from the value of the function.

3. The apparatus of claim 1, wherein the N-th layer media data is the entire media data except key clip data and key frame data, and the (N+1)-th layer media data is the key clip data except the key frame data.

4. The apparatus of claim 1, wherein the N-th layer data is key clip data of the media data except key frame data of the media data, and the (N+1)-th layer data is the key frame data of the media data.

5. The apparatus of claim 4, wherein the N-th layer key generator generates the N-th layer key by applying an (N−1)-th layer key to the predetermined function.

6. The apparatus of claim 1, further comprising:
    an N-th layer key buffer temporarily storing the N-th layer key;
    an N-th layer key generation commander commanding the N-th layer key generator to generate the N-th layer key according to meta-data when the meta-data is received; and
    an N-th layer key supply commander commanding the N-th layer key buffer to supply the N-th layer key to the N-th layer data encryptor according to the meta data when the N-th layer media data is received.

7. The apparatus of claim 1, further comprising:
    an (N+1)-th layer key buffer temporarily storing the (N+1)-th layer key;
    an (N+1)-th layer key generation commander commanding the (N+1)-th layer key generator to generate the (N+1)-th layer key according to meta-data when the meta-data is received; and
    an (N+1)-th layer key supply commander commanding the (N+1)-th layer key buffer to supply the (N+1)-th layer key to the (N+1)-th layer data encryptor according to the meta data when the (N+1)-th layer media data is received.

8. The apparatus of claim 1, further comprising:
    an N-th layer key encryptor encrypting the N-th layer key.

9. The apparatus of claim 8, further comprising:
    an encrypted N-th layer key transmitter transmitting the encrypted N-th layer key.

10. The apparatus of claim 8, further comprising:
    an encrypted N-th layer key storage block storing the encrypted N-th layer key; and
    an encrypted N-th layer key transmitter transmitting the encrypted N-th layer key stored in the encrypted N-th layer key storage block upon a request from a user.

11. The apparatus of claim 1, further comprising:
    an (N+1)-th layer key encryptor encrypting the (N+1)-th layer key.

12. The apparatus of claim 11, further comprising:
    an encrypted (N+1)-th layer key transmitter transmitting the encrypted (N+1)-th layer key.

13. The apparatus of claim 11, further comprising:
    an encrypted (N+1)-th layer key storage block storing the encrypted (N+1)-th layer key; and
    an encrypted (N+1)-th layer key transmitter transmitting the encrypted (N+1)-th layer key stored in the encrypted (N+1)-th layer key storage block upon a request from a user.

14. The apparatus of claim 1, further comprising:
    an encrypted N-th layer data transmitter transmitting the encrypted N-th layer media data.

15. The apparatus of claim 1, further comprising:
    an encrypted N-th layer data storage block storing the encrypted N-th layer media data; and
    an encrypted N-th layer data transmitter transmitting the encrypted N-th layer media data stored in the encrypted N-th layer data storage block upon a request from a user.

16. The apparatus of claim 1, further comprising:
    an encrypted (N+1)-th layer data transmitter transmitting the encrypted (N+1)-th layer media data.

17. The apparatus of claim 1, further comprising:
    an encrypted (N+1)-th layer data storage block storing the encrypted (N+1)-th layer media data; and
    an encrypted (N+1)-th layer data transmitter transmitting the encrypted (N+1)-th layer media data stored in the encrypted (N+1)-th layer data storage block upon a request from a user.

18. An apparatus to hierarchically decrypt media data, comprising:
    an N-th layer key generator generating an N-th layer key;
    an (N+1)-th layer key generator generating an (N+1)-th layer key by applying the N-th layer key to a predetermined function;
    an encrypted N-th layer data decryptor decrypting encrypted N-th layer media data using the N-th layer key; and
    an encrypted (N+1)-th layer data decryptor decrypting encrypted (N+1)-th layer media data using the (N+1)-th layer key.

19. The apparatus of claim 18, wherein the predetermined function is a one-way function by which a value of the function is found from an input value but the input value is not found from the value of the function.

20. The apparatus of claim 18, wherein the N-th layer media data is the entire media data except key clip data and key frame data, and the (N+1)-th layer media data is the key clip data except the key frame data.

21. The apparatus of claim 20, wherein the N-th layer key generator receives an N-th layer key and generates the N-th layer key.

22. The apparatus of claim 20, wherein the N-th layer key generator comprises:

an encrypted N-th layer key receiver receiving the encrypted N-th layer key; and
an encrypted N-th layer key decryptor decrypting the encrypted N-th layer key to generate the N-th layer key.

23. The apparatus of claim 18, wherein the N-th layer media data is key clip data of the media data except key frame data of the media data, and the (N+1)-th layer media data is the key frame data of the media data.

24. The apparatus of claim 23, wherein the N-th layer key generator generates the N-th layer key by applying an (N−1)-th layer key to the predetermined function.

25. The apparatus of claim 18, further comprising:
an N-th layer key buffer temporarily storing the N-th layer key;
an N-th layer key generation commander commanding the N-th layer key generator to generate the N-th layer key according to meta-data when the meta-data is received; and
an N-th layer key supply commander commanding the N-th layer key buffer to supply the N-th layer key to the encrypted N-th layer data decryptor according to the meta data when the encrypted N-th layer media data is received.

26. The apparatus of claim 18, further comprising:
an (N+1)-th layer key buffer temporarily storing the (N+1)-th layer key;
an (N+1)-th layer key generation commander commanding the (N+1)-th layer key generator to generate the (N+1)-th layer key according to meta-data when the meta-data is received; and
an (N+1)-th layer key supply commander commanding the (N+1)-th layer key buffer to supply the (N+1)-th layer key to the encrypted (N+1)-th layer data decryptor according to the meta data when the encrypted (N+1)-th layer media data is received.

27. An apparatus to hierarchically encrypt and decrypt media data, comprising:
a hierarchical encryption unit generating an N-th layer key, generating an (N+1)-th layer key by applying the generated N-th layer key to a predetermined function, encrypting N-th layer media data using the N-th layer key, and encrypting (N+1)-th layer media data using the generated (N+1)-th layer key; and
a hierarchical decryption unit generating the N-th layer key, generating the (N+1)-th layer key by applying the N-th layer key to the predetermined function, decrypting the encrypted N-th layer media data using the N-th layer key, and decrypting the encrypted (N+1)-th layer media data using the (N+1)-th layer key.

28. The apparatus of claim 27, wherein the predetermined function is a one-way function by which a value of the function is found from an input value but the input value is not found from the value of the function.

29. The apparatus of claim 27, wherein the N-th layer media data is the entire media data except key clip data and key frame data, and the (N+1)-th layer media data is the key clip data except the key frame data.

30. The apparatus of claim 27, wherein the N-th layer media data is key clip data of the media data except key frame data of the media data, and the (N+1)-th layer media data is the key frame data of the media data.

31. The apparatus of claim 27, wherein the N-th layer key generator generates the N-th layer key by applying an (N−1)-th layer key to the predetermined function.

32. A method of hierarchically encrypting media data, comprising:

generating an N-th layer key;
generating an (N+1)-th layer key by applying the N-th layer key to a predetermined function;
encrypting N-th layer media data using the N-th layer key; and
encrypting (N+1)-th layer media data using the (N+1)-th layer key.

33. The method of claim 32, wherein the predetermined function is a one-way function by which a value of the function is found from an input value but the input value is not found from the value of the function.

34. The method of claim 33, wherein the N-th layer media data is the entire media data except key clip data and key frame data, and the (N+1)-th layer media data is the key clip data except the key frame data.

35. The method of claim 32, wherein the N-th layer media data is key clip data of the media data except key frame data of the media data, and the (N+1)-th layer media data is the key frame data of the media data.

36. The method of claim 35, wherein the generating of the N-th layer key comprises generating the N-th layer key by applying an (N-1)-th layer key to the predetermined function.

37. The method of claim 32, further comprising:
temporarily storing the N-th layer key;
commanding that the N-th layer key be generated according to meta-data when the meta-data is received; and
commanding that the stored N-th layer key be supplied to encrypt the N-th layer media data according to the meta data when the N-th layer media data is received.

38. The method of claim 32, further comprising:
temporarily storing the (N+1)-th layer key;
commanding that the (N+1)-th layer key be generated according to meta-data when the meta-data is received; and
commanding that the stored (N+1)-th layer key be supplied to encrypt the (N+1)-th layer media data according to the meta data when the (N+1)-th layer media data is received.

39. The method of claim 32, further comprising:
encrypting the N-th layer key.

40. The method of claim 39, further comprising:
transmitting the encrypted N-th layer key.

41. The method of claim 39, further comprising:
storing the encrypted N-th layer key; and
transmitting the encrypted and stored N-th layer key upon a request from a user.

42. The method of claim 32, further comprising:
encrypting the (N+1)-th layer key.

43. The method of claim 42, further comprising:
transmitting the encrypted (N+1)-th layer key.

44. The method of claim 42, further comprising:
storing the encrypted (N+1)-th layer key; and
transmitting the encrypted and stored (N+1)-th layer key upon a request from a user.

45. The method of claim 32, further comprising:
transmitting the encrypted N-th layer media data.

46. The method of claim 32, further comprising:
storing the encrypted N-th layer media data; and
transmitting the encrypted and stored N-th layer media data at a user's request.

47. The method of claim 32, further comprising:
transmitting the encrypted (N+1)-th layer media data.

48. The method of claim 32, further comprising:
storing the encrypted (N+1)-th layer media data; and
transmitting the encrypted and the stored (N+1)-th layer media data upon a request from a user.

49. A method of hierarchically decrypting media data, the method comprising:
- generating an N-th layer key;
- generating an (N+1)-th layer key by applying the N-th layer key to a predetermined function;
- decrypting encrypted N-th layer media data using the N-th layer key; and
- decrypting encrypted (N+1)-th layer media data using the (N+1)-th layer key.

50. The method of claim 49, wherein the predetermined function is a one-way function by which a value of the function is found from an input value but the input value is not found from the value of the function.

51. The method of claim 49, wherein the N-th layer media data is the entire media data except key clip data and key frame data, and the (N+1)-th layer media data is the key clip data except the key frame data.

52. The method of claim 51, wherein the generating of the N-th layer key comprises:
- receiving an N-th layer key and generating the N-th layer key.

53. The method of claim 51, Wherein the generating of the N-th layer key comprises:
- receiving an encrypted N-th layer key; and
- decrypting the encrypted N-th layer key to generate the N-th layer key.

54. The method of claim 49, wherein the N-th layer media data is key clip data of the media data except key frame data of the media data, and the (N+1)-th layer media data is the key frame data of the media data.

55. The method of claim 54, wherein the generating of the N-th layer key comprises:
- generating the N-th layer key by applying an (N-1)-th layer key to the predetermined function.

56. The method of claim 49, further comprising:
- temporarily storing the N-th layer key;
- commanding that the N-th layer key be generated according to meta-data when the meta-data is received; and
- commanding that the stored N-th layer key be supplied to the decryption of the encrypted N-th layer media data according to the meta data when the encrypted N-th layer media data is received.

57. The method of claim 49, further comprising:
- temporarily storing the (N+1)-th layer key;
- commanding that the (N+1)-th layer key be generated according to meta-data when the meta-data is received; and
- commanding that the stored (N+1)-th layer key be supplied to the encryption of the (N+1)-th layer media data according to the meta data when the encrypted (N+1)-th layer media data is received.

58. A method of hierarchically encrypting and decrypting media data, the method comprising:
- generating an N-th layer key;
- generating an (N+1)-th layer key by applying the generated N-th layer key to a predetermined function;
- encrypting N-th layer media data using the N-th layer key, and encrypting (N+1)-th layer media data using the generated (N+1)-th layer key;
- generating the N-th layer key;
- generating the (N+1)-th layer key by applying the N-th layer key to the predetermined function;
- decrypting the encrypted N-th layer media data using the N-th layer key; and
- decrypting the encrypted (N+1)-th layer media data using the (N+1)-th layer key.

59. The method of claim 58, wherein the predetermined function is a one-way function by which a value of the function is found from an input value but the input value is not found from the value of the function.

60. The method of claim 58, wherein the N-th layer media data is the entire media data except key clip data and key frame data, and the (N+1)-th layer media data is the key clip data except the key frame data.

61. The method of claim 58, wherein the N-th layer media data is key clip data of the media data except key frame data of the media data, and the (N+1)-th layer media data is the key frame data of the media data.

62. The method of claim 61, further comprising:
- generating the N-th layer key by applying an (N−1)-th layer key to the predetermined function.

63. A computer readable storage medium controlling a computer and comprising a process of:
- generating an N-th layer key;
- generating an (N+1)-th layer key by applying the N-th layer key to a predetermined function;
- encrypting N-th layer media data using the N-th layer key; and
- encrypting (N+1)-th layer media data using the (N+1)-th layer key.

64. A computer readable storage medium controlling a computer and comprising a process of hierarchically decrypting media data, comprising:
- generating an N-th layer key;
- generating an (N+1)-th layer key by applying the N-th layer key to a predetermined function;
- decrypting encrypted N-th layer media data using the N-th layer key; and
- decrypting encrypted (N+1)-th layer data using the (N+1)-th layer key.

65. A computer readable storage medium controlling a computer and comprising a process of hierarchically encrypting and decrypting media data, comprising:
- generating an N-th layer key;
- generating an (N+1)-th layer key by applying the generated N-th layer key to a predetermined function;
- encrypting N-th layer data using the N-th layer key, and encrypting (N+1)-th media layer data using the generated (N+1)-th layer key;
- generating the N-th layer key;
- generating the (N+1)-th layer key by applying the N-th layer key to the predetermined function;
- decrypting the encrypted N-th layer media data using the N-th layer key; and
- decrypting the encrypted (N+1)-th layer media data using the (N+1)-th layer key.

* * * * *

UNITED STATES PATENT AND TRADEMARK OFFICE
CERTIFICATE OF CORRECTION

| | | |
|---|---|---|
| PATENT NO. | : 7,391,864 B2 | Page 1 of 1 |
| APPLICATION NO. | : 10/623800 | |
| DATED | : June 24, 2008 | |
| INVENTOR(S) | : Yang-lim Choi et al. | |

It is certified that error appears in the above-identified patent and that said Letters Patent is hereby corrected as shown below:

On the Title Page, Item (56) under U.S. Patent Documents, below
"2003/0002668 A1   1/2003   Graunke et al. ....................... 380/45" insert
--2002/0116471        8/2002   Shteyn--.

Column 15, Line 22, change "Wherein" to --wherein--.

Column 16, Line 40, after "layer" insert --media--.

Column 16, Line 48, change "layer data" to --layer media data--.

Signed and Sealed this

Fourth Day of November, 2008

JON W. DUDAS
*Director of the United States Patent and Trademark Office*